(12) United States Patent
Lee et al.

(10) Patent No.: US 8,009,901 B2
(45) Date of Patent: Aug. 30, 2011

(54) IMAGE PROCESSING APPARATUS AND METHOD OF THE SAME

(75) Inventors: Hsin-Hung Lee, Fongshan (TW);
Yu-Wen Huang, Sanchong (TW);
Hsu-Hung Chen, Sanchong (TW);
Tung-Lin Hsieh, Jhongli (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1020 days.

(21) Appl. No.: 11/898,598

(22) Filed: Sep. 13, 2007

(65) Prior Publication Data
US 2008/0112636 A1 May 15, 2008

(30) Foreign Application Priority Data
Nov. 15, 2006 (TW) .................. 95142194 A (51) Int. Cl.
*G06K 9/00* (2006.01)
*H04N 13/00* (2006.01)
*H04N 3/14* (2006.01)
*G02B 21/22* (2006.01)
*G02B 27/22* (2006.01)

(52) U.S. Cl. .......... 382/154; 382/100; 348/42; 348/305; 359/376; 359/464

(58) Field of Classification Search .......... 359/463, 359/407, 464, 376, 619, 462, 821, 421, 400; 349/15, 95; 351/210, 158; 345/419, 8; 382/151, 382/154, 168, 174, 214, 305, 100; 348/42, 348/51, 793, 305, 550, 56, E13.059, E13.04, 348/E13.033, E13.029, E13.071, E13.073, 348/E13.014, E13.037, E13.058, E13.025, 348/E13.038, E13.046, E13.072, E13.064, 348/E13.022, E13.03, E13.015, E13.05, E13.007, 348/E13.023, E13.041, E13.044, E13.062, E13.063, E13.047, E13.049, E13.067, E13.034, 464, E13.019; 348/E13.052, E13.061, E13.031, E13.043, 376, E13.009, E13.013, E13.018, E13.021, E13.024, E13.068, E13.066, E13.02, E13.042, E13.028
See application file for complete search history.

(56) References Cited

U.S. PATENT DOCUMENTS

| | | | |
|---|---|---|---|
| 4,907,860 A * | 3/1990 | Noble | 349/15 |
| 5,956,001 A * | 9/1999 | Sumida et al. | 345/55 |
| 6,220,709 B1 * | 4/2001 | Heger | 353/8 |
| 6,489,962 B1 * | 12/2002 | Ambroziak et al. | 345/427 |

(Continued)

FOREIGN PATENT DOCUMENTS
JP 2001-54142 2/2001
(Continued)

OTHER PUBLICATIONS

English language translation of JP 2001-54142 (published Feb. 23, 2001).
English language translation of JP 2001-54143 (published Feb. 23, 2001).

*Primary Examiner* — Sheela C Chawan
(74) *Attorney, Agent, or Firm* — Thomas|Kayden (57) ABSTRACT

The invention provides an adjusting apparatus and a method thereof for adjusting a 3D image constituted by a plurality of interlaced first-eye-viewed image lines and second-eye-viewed image lines to be outputted to a display panel. However, in practice, there is a leakage problem in a pair of glasses for viewing the 3D image. Therefore, the invention solves the leakage problem by matching a plurality of pre-stored leakage values and then generating a proper output with a corrective calculation.

12 Claims, 9 Drawing Sheets

U.S. PATENT DOCUMENTS

| | | | |
|---|---|---|---|
| 6,825,985 B2 * | 11/2004 | Brown et al. | 359/619 |
| 7,154,653 B2 * | 12/2006 | Kean et al. | 359/232 |
| 7,639,838 B2 * | 12/2009 | Nims | 382/103 |
| 7,697,080 B2 * | 4/2010 | Mather et al. | 349/15 |
| 7,889,196 B2 * | 2/2011 | Nomura et al. | 345/419 |

FOREIGN PATENT DOCUMENTS

| | | |
|---|---|---|
| JP | 2001-54143 | 2/2001 |

* cited by examiner

| | | | | |
|---|---|---|---|---|
| Right-eye | 100 | 110 | 115 | 120 |
| Left-eye | 111 | 112 | 113 | 115 |
| Right-eye | 100 | 110 | 115 | 120 |
| Left-eye | 111 | 112 | 113 | 115 |
| Right-eye | 100 | 110 | 115 | 120 |
| Left-eye | 111 | 112 | 113 | 115 |

FIG. 4B

| | | | | |
|---|---|---|---|---|
| Right-eye | 195 | 200 | 202 | 205 |
| Left-eye | | | | |
| Right-eye | | | | |
| Left-eye | | | | |
| Right-eye | | | | |
| Left-eye | | | | |

FIG. 4C

| | | | | |
|---|---|---|---|---|
| Right-eye | 6 | 7 | 7 | 7 |
| Left-eye | | | | |
| Right-eye | | | | |
| Left-eye | | | | |
| Right-eye | | | | |
| Left-eye | | | | |

FIG. 4D

| | | | | |
|---|---|---|---|---|
| Right-eye | | 1/4 ↘ | | | |
| Left-eye | | | → 1/2 | | |
| Right-eye | | | | 1/4 ↗ | |
| Left-eye | | | | | 1/4 ↘ |
| Right-eye | | | | | → 1/2 |
| Left-eye | | | | | 1/4 ↗ |

FIG. 4E

| Right-eye |  |  |  |  |
|---|---|---|---|---|
| Left-eye | 4.8 | 6.8 | 7 | 5.2 |
| Right-eye |  |  |  |  |
| Left-eye |  |  |  |  |
| Right-eye |  |  |  |  |
| Left-eye |  |  |  |  |

FIG. 4F

| Right-eye | 195 | 200 | 202 | 205 |
|---|---|---|---|---|
| Left-eye | 196 | 196 | 196 | 198 |
| Right-eye |  |  |  |  |
| Left-eye |  |  |  |  |
| Right-eye |  |  |  |  |
| Left-eye |  |  |  |  |

FIG. 4G

| Right-eye | 6 | 7 | 7 | 7 |
|---|---|---|---|---|
| Left-eye | 7 | 7 | 7 | 7 |
| Right-eye |  |  |  |  |
| Left-eye |  |  |  |  |
| Right-eye |  |  |  |  |
| Left-eye |  |  |  |  |

FIG. 4H

| Right-eye |  |  |  |  |
|---|---|---|---|---|
| Left-eye | 4.8 | 6.8 | 7 | 5.2 |
| Right-eye | 5.2 | 7 | 7 | 5.2 |
| Left-eye |  |  |  |  |
| Right-eye |  |  |  |  |
| Left-eye |  |  |  |  |

FIG. 5

IMAGE PROCESSING APPARATUS AND METHOD OF THE SAME

BACKGROUND OF THE INVENTION

1. Field of the Invention

The invention relates to an adjusting apparatus and a method thereof for adjusting a 3D image, and particularly to an adjusting apparatus and a method of generating a correct output for a display panel with a corrective calculation.

2. Description of the Prior Art

Because the positions of the left-eye and the right-eye are different, the images observed by the left-eye and the right-eye become slightly different. If the left-eye captures the images the left-eye can see, and the right-eye captures the images the right-eye can see, then the brain will be cheated to generate a three-dimensional (3D) vision. Nowadays, the method of transmitting three-dimensional images is to interlace the images respectively for the two eyes in horizontal or vertical ways. And polarization glasses for viewers are designed to allow the left-eye to capture only its corresponding image and the right-eye to capture only its corresponding image; thereby, three-dimensional images can be formed.

However, when polarization glasses are used to view a three-dimensional film, because the glasses have the problem of light leakage, users often feel uncomfortable due to irregular lightness of the screen, interlaced images, and ghost shadows. This situation will affect the evaluation of the users about the quality of 3D images. This leakage phenomenon is generated because of poor design technologies of polarization glasses. It causes the left-eye to capture some right-eye image and the right-eye to capture some left-eye image.

Therefore, the main scope of the invention is to provide an image adjusting device to solve the above problems.

SUMMARY OF THE INVENTION

A scope of the invention is to provide an adjusting apparatus and a method thereof for adjusting a 3D image.

Another scope of the invention is to provide an adjusting apparatus and a method of generating a correct output for a display panel with a corrective calculation.

In an embodiment according to the invention, the adjusting apparatus is used for adjusting a 3D image and providing it to a display panel. The 3D image is constituted by interlaced N first-eye-viewed image lines and N second-eye-viewed image lines; moreover, N is an integer larger than 1. The adjusting apparatus includes an adjusting module, a first converting module, a second converting module, a first determining module, a second determining module, a line buffer, and a distributing module.

"i" is an integer index ranging from 2 to N, and "j" is an integer index ranging from 1 to N. The adjusting module is capable of receiving the ith first-eye-viewed image line and an ith set of distributed first-eye-viewed leakage values, generated based upon the (i−1)th second-eye-viewed image line, to generate an ith adjusted first-eye-viewed image line for the display panel. The adjusting module is also capable of receiving the jth second-eye-viewed image line and a jth set of distributed second-eye-viewed leakage values, generated based upon the jth first-eye-viewed image line, to generate a jth adjusted second-eye-viewed image line for the display panel.

The first determining module is configured to receive the jth adjusted first-eye-viewed image line. And, the second determining module is configured to receive the (i−1)th adjusted second-eye-viewed image line. The first determining module is used for determining the jth set of second-eye-viewed leakage values based on the jth adjusted first-eye-viewed image line and a plurality of pre-stored second-eye-viewed leakage values.

The second determining module is used for determining the ith set of first-eye-viewed leakage values in accordance with the (i−1)th adjusted second-eye-viewed image line and a plurality of pre-stored first-eye-viewed leakage values. The pre-stored leakage values represent the right-eye information leaked to the left-eye or the left-eye information leaked to the right-eye.

In addition, because most display panels have the characteristic of gamma, the adjusting apparatus according to the invention further includes a step of gray-level linearity conversion. This step is performed by the first converting module and the second converting module. The first converting module is electrically coupled between the adjusting module and the first determining module; besides, it is also electrically coupled to the display panel. As for the second converting module, it is electrically coupled between the adjusting module and the second determining module; moreover, it is also electrically coupled to the display panel.

The first converting module is used for receiving the jth adjusted first-eye-viewed image line outputted by the adjusting module and converting the jth adjusted first-eye-viewed image line into the jth converted first-eye-viewed image line based on the characteristic of the display panel, wherein the jth converted first-eye-viewed image line replaces the jth adjusted first-eye-viewed image line and is outputted to the display panel and the first determining module.

And, the second converting module is used for receiving the (i−1)th adjusted second-eye-viewed image line outputted by the adjusting module and converting the (i−1)th adjusted second-eye-viewed image line into the (i−1)th converted second-eye-viewed image line based on the characteristic of the display panel, wherein the (i−1)th converted second-eye-viewed image line replaces the (i−1)th adjusted second-eye-viewed image line and is outputted to the display panel and the second determining module.

The line buffer is configured to alternately receive and buffer the jth set of second-eye-viewed leakage values and the ith set of first-eye-viewed leakage values. The distributing module is configured to receive the jth set of second-eye-viewed leakage values which are buffered in the line buffer to generate the jth set of distributed second-eye-viewed leakage values relative to the jth second-eye-viewed image line. The distributing module is also configured to receive the ith set of first-eye-viewed leakage values which are buffered in the line buffer to generate the ith set of distributed first-eye-viewed leakage values relative to the ith first-eye-viewed image line.

In other words, when the adjusting module receives a row of image line, the leakage values of the row of image stored in the line buffer are weightedly distributed by the distributing module to transmit the distributed leakage values to the adjusting module. Then, the adjusting module generates the row of adjusted image lines based on the received image lines and the distributed leakage values. And, the leakage values of the row of image stored in the line buffer are processed by the first determining module or the second determining module based on the former row of adjusted image lines.

For example, when the adjusted module receives the fifth row of image line (according to this embodiment, the fifth row of image line is the third first-eye-viewed image), the distributing module also redistributes the fifth set of leakage values stored in the line buffer with a fixed weighted ratio, and transmits the fifth distributed leakage values to the adjusting module. The adjusting module then generates the fifth row of adjusted image line based on the received fifth row of image line and the fifth set of leakage values to generate the fifth row of adjusted image line (namely the third adjusted first-eye-viewed image). The fifth set of leakage values is processed by the second determining module based on the fourth row of adjusted image line (namely the second adjusted second-eye-viewed image) and is stored in the line buffer.

In another example, when the adjusted module receives the eighth row of image line (according to this embodiment, the eighth row of image line is the fourth first-eye-viewed image), the distributing module also redistributes the eighth set of leakage values stored in the line buffer with a fixed weighted ratio, and transmits the eighth distributed leakage values to the adjusting module. The adjusting module then generates the eighth row of adjusted image line based on the received eighth row of image line and the eighth set of leakage values to generate the eighth row of adjusted image line (namely the fourth adjusted second-eye-viewed image). The eighth set of leakage values is processed by the second determining module based on the seventh row of adjusted image line (namely the fourth adjusted first-eye-viewed image) and is stored in the line buffer.

Therefore, if the adjusting module receives a certain row of first-eye-viewed image line, the set of leakage values corresponding to the first-eye-viewed image line is then processed by the second determining module based on the former row of adjusted second-eye-viewed image line. If the adjusting module receives a certain row of second-eye-viewed image line, the set of leakage values corresponding to the second-eye-viewed image line is then processed by the first determining module based on the former row of adjusted first-eye-viewed image line.

It should be noticed, in the adjusting apparatus according to the invention, because the first row of image line (namely the first first-eye-viewed image line) has no former adjusted image lines, the first row of image line is outputted as a first row of adjusted image line. Similarly, because the last row of adjusted image line (namely the last second-eye-viewed image line) has no following row of image lines to be processed, the last row of adjusted image line is not further processed by the second determining module.

Besides, the adjusted image lines can be directly outputted to the display panel in principle. Since most display panels have the characteristic of gamma, the adjusted image lines may need to be further processed by the step of gray linearity conversion before being outputted to the display panel, the first determining module, and the second determining module. Namely, the adjusted first-eye-viewed image lines are converted to the converted image lines by the first converting module and the adjusted second-eye-viewed image lines are converted to the converted image lines by the second converting module. And, the converted image lines are then transmitted to the display panel, the first determining module, and the second determining module.

Briefly, each row of image line of the 3D image is adjusted, converted, and outputted to the display panel, and can be processed by the determining modules to generate a set of leakage values for adjustment of the next row of image line. The steps are circularly performed until the 3D image process is completely processed.

As described above, the adjusting apparatus according to the invention adjusts the next row of image input by distributing the leakage values, and converts the adjusted image input/output in coordination with the characteristic of the display panel to solve the leakage problem and show the image precisely.

The advantage and spirit of the invention may be understood by the following recitations together with the appended drawings.

DETAILED DESCRIPTION OF THE INVENTION

Figure 1:
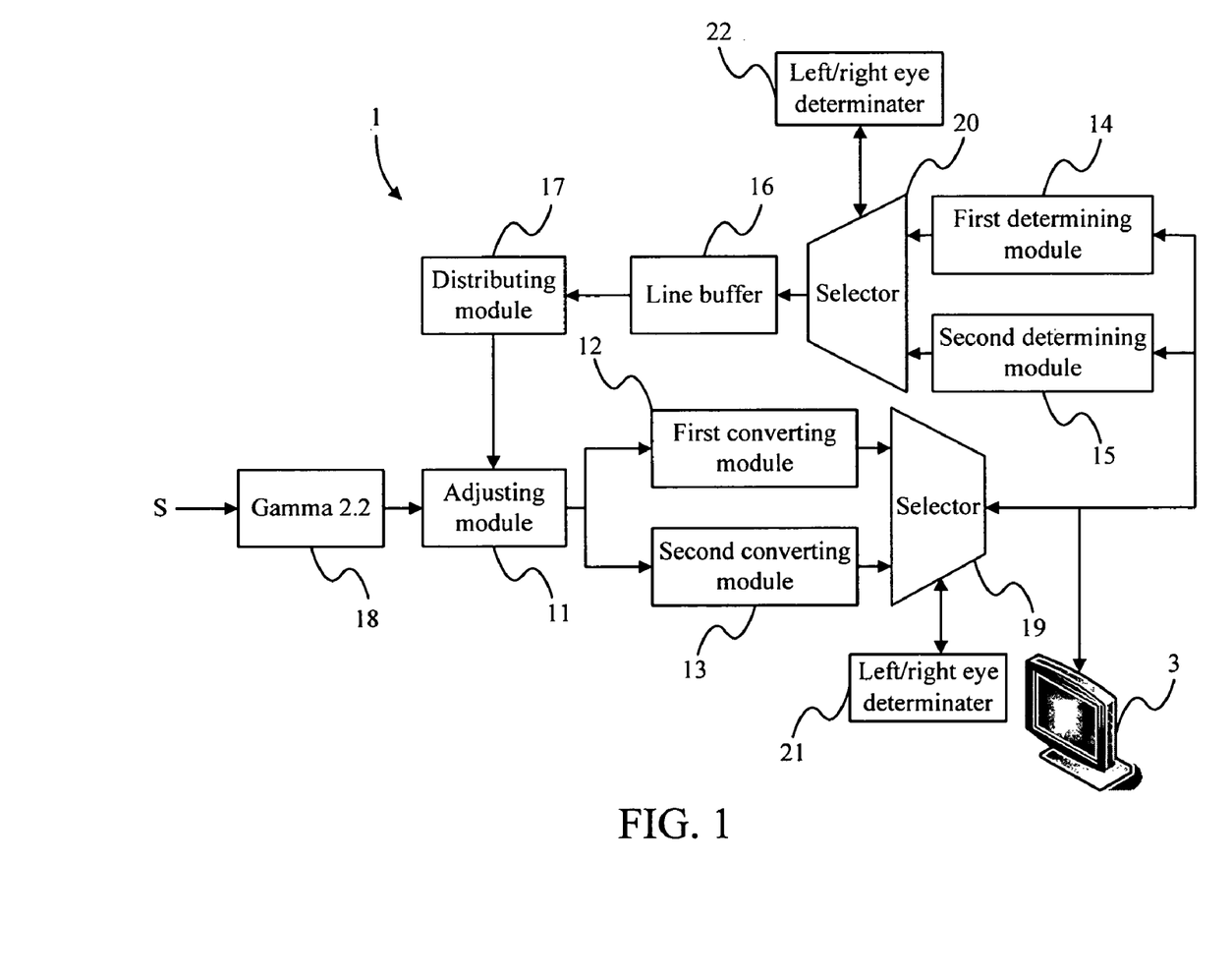
FIG. 1 is a functional block diagram of adjusting apparatus of a preferred embodiment based on the invention.

Please refer to FIG. 1. FIG. 1 is the functional block diagram of the adjusting apparatuses in an embodiment based on the invention. In the embodiment, the adjusting apparatus 1 is used for adjusting a 3D image S to be outputted to a display panel 3. The 3D image is constituted by interlaced N first-eye-viewed image lines and N second-eye-viewed image lines. N is an integer larger than 1. The adjusting apparatus 1 includes an adjusting module 11, a first converting module 12, a second converting module 13, a first determining module 14, a second determining module 15, a line buffer 16, and a distributing module 17.

And, the adjusting apparatus 1 also includes two selectors (19 and 20) and two left/right eye determinaters (21 and 22). In the embodiment, the 3D image S is in compliance with the RGB color space, and the image signal is show with gamma equal to 0.45. Thus, before the 3D image S is inputted to the adjusting module 11, it is converted first by a gamma 2.2 converter 18. Besides, in the embodiment, the first eye corresponds to the right eye, and the second eye corresponds to the left eye.

The adjusting module 11 is configured to receive the ith first-eye-viewed image line and an ith set of distributed first-eye-viewed leakage values to generate an ith adjusted first-eye-viewed image line. The adjusting module 11 is also capable of receiving the jth second-eye-viewed image line and a jth set of distributed second-eye-viewed leakage values to generate a jth adjusted second-eye-viewed image line. Herein i is an integer index ranging from 2 to N, and j is an integer index ranging from 1 to N. In the embodiment, the adjusting module 11 subtracts the ith set of distributed first-eye-viewed leakage value from the ith first-eye-viewed image line to generate the ith adjusted first-eye-viewed image line. Similarly, the adjusting module 11 subtracts the jth set of distributed second-eye-viewed leakage value from the jth second-eye-viewed image line to generate the jth adjusted second-eye-viewed image line.

Namely, when the adjusting module 11 receives a row of image lines, the leakage values of the row of images stored in the line buffer 16 are gained by the distributing module 17 using the weighting distribution way to transmit the distributed leakage values to the adjusting module 11. Then, the adjusting module 11 generates the row of adjusted image lines based on the received image lines and the distributed leakage values.

For example, when the adjusting module 11 receives the fifth row of image lines (in the embodiment, the row of image lines is the third first-eye-viewed image), the distributing module 17 will redistribute the fifth set of leakage values stored in the line buffer 16 with a fixed weighting ratio and transmit the fifth distributed leakage values to the adjusting module 11. Then, the adjusting module 11 generates the fifth row of adjusted image lines based on the received fifth row of image lines and the fifth set of leakage values to generate the fifth row of adjusted image lines (namely the third adjusted first-eye-viewed image).

For example, when the adjusted module 11 receives the eighth row of image lines (in the embodiment, the row of image lines is the fourth first-eye-viewed image), the distributing module 17 will redistribute the eighth set of leakage values stored in the line buffer 16 with a fixed weighting ratio and transmit the eighth distributed leakage values to the adjusting module 11. Then, the adjusting module 11 generates the eighth row of adjusted image lines based on the received eighth row of image lines and the eighth set of leakage values to generate the eighth row of adjusted image lines (namely the fourth adjusted second-eye-viewed image). Herein the row of leakage values of images stored in the line buffer 16 is processed by the first determining module 14 or the second determining module 15 based on the former row of adjusted image lines. The detail will be described later.

Besides, the method of generating the adjusted image lines by the adjusting module 11 is to subtract the corresponding set of leakage values from each of received image lines, e.g., the fifth set of leakage values is subtracted from the fifth row of image lines in the above mentioned example. Namely, the received image lines include several pixels, and each pixel corresponds to a leakage value. And, the corresponding leakage value is subtracted from each pixel of the image line by the adjusting module 11 to be the adjusted image lines. In addition, although a horizontal interlaced 3D image is taken in the example, it is also applicable in a vertical interlaced 3D image. The detail is not further described herein.

The first converting module 12 and the second converting module 13 are electrically coupled between the adjusting module 11 and the selector 19. The selector 19 is also electrically coupled to the first determining module 14, the second determining module 15 and the display panel 3. The selector 19 is also electrically coupled to the left/right eye determinater 21.

The first converting module 12 is used for receiving the jth adjusted first-eye-viewed image line outputted by the adjusting module 11 and converting the jth adjusted first-eye-viewed image line into the jth converted first-eye-viewed image line based on the characteristic of the display panel 3. Similarly, the second converting module 13 is used for receiving the (i−1)th adjusted second-eye-viewed image line outputted by the adjusting module 11 and converting the (i−1)th adjusted second-eye-viewed image line into the (i−1)th converted second-eye-viewed image line based on the characteristic of the display panel 3.

The jth converted first-eye-viewed image line is then outputted to the display panel 3 and the first determining module 14. And, the (i−1)th converted second-eye-viewed image line is outputted to the display panel 3 and the second determining module 15. Besides, in the embodiment, although the signals outputted by the adjusting module 11 are transmitted to the first converting module 12 and the second converting module 13 at the same time, and the selector 19 also simultaneously receives the image signal outputted by the first converting module 12 and the second converting module 13, the selector 19 will correctly output the correct image signal to the display panel 3, the first determining module 14 and the second determining module 15 according to the signal of the left/right eye determinater 21 coupled to the selector 19.

For example, if the adjusting module 11 outputs the fifth row of adjusted image lines (namely the third adjusted first-eye-viewed image line) to the first converting module 12 and the second converting module 13, according to the invention, the fifth row of converted image lines conforming to the invention will be generated by the first converting module 12. But an image signal which does not conform to the invention will be also generated by the second converting module 13 at the same time. Then, both image signals above mentioned are transmitted to the selector 19.

According to the signal of the left/right eye determinater 21, the selector 19 will selectively transmit the fifth row of converted image lines and abandon the image signals transmitted by the second converting module 13. On the contrary, if the adjusting module 11 outputs the eighth row of adjusted image lines (namely the fourth adjusted second-eye-viewed image line) to the first converting module 12 and the second converting module 13, according to the invention, the eighth row of converted image lines conforming to the invention will be generated by the second converting module 13. But an image signal which does not conform to the invention will be also generated by the first converting module 12 at the same time. Then, both the image signals above mentioned are transmitted to the selector 19. According to the signal of the left/right eye determinater 21, the selector 19 will selectively transmit the eighth row of converted image lines and abandon the image signals transmitted by the first converting module 12.

Figure 2A:
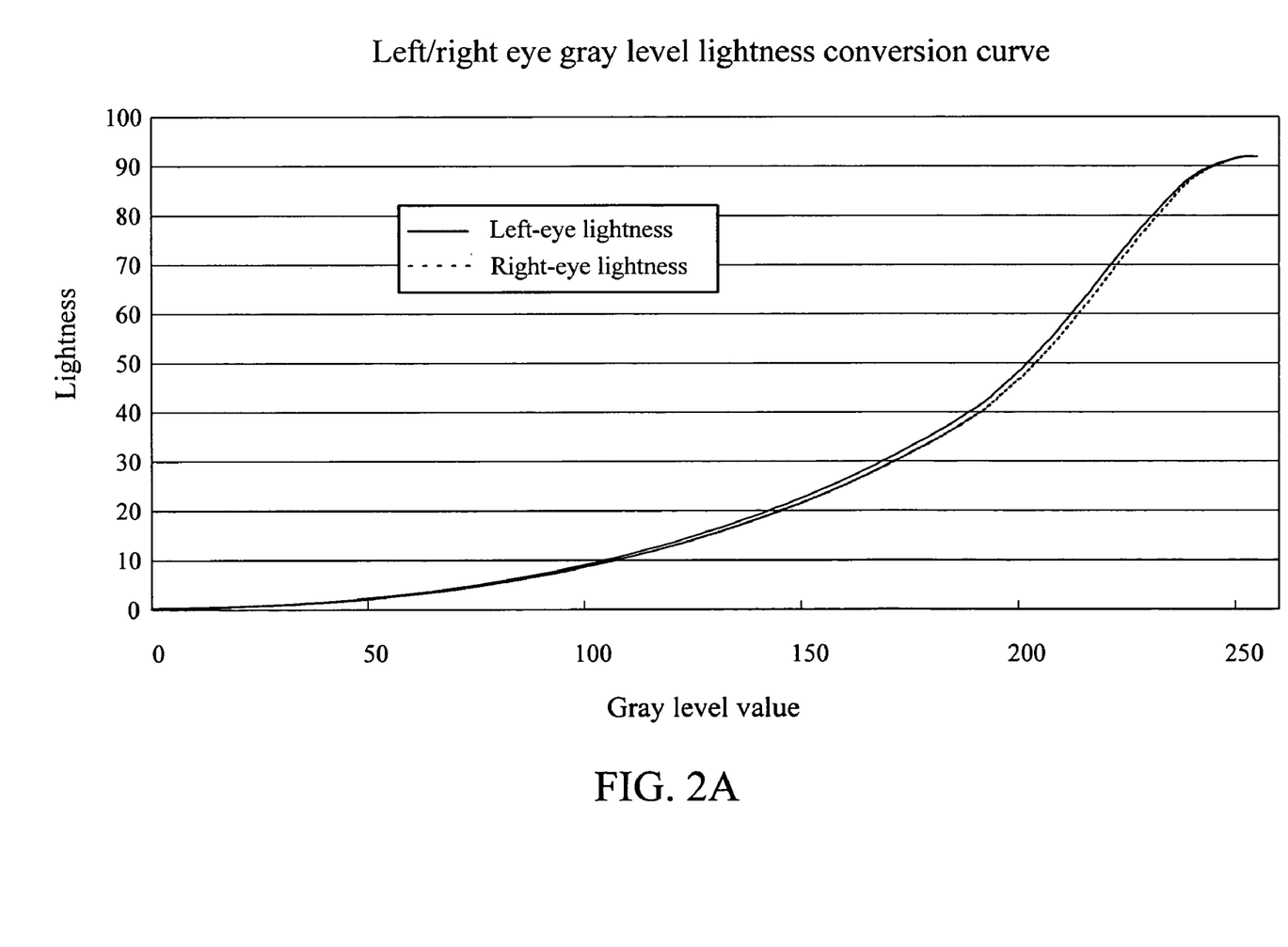
FIG. 2A shows the gray level lightness conversion curve of a preferred embodiment based on the invention.
Figure 2B:
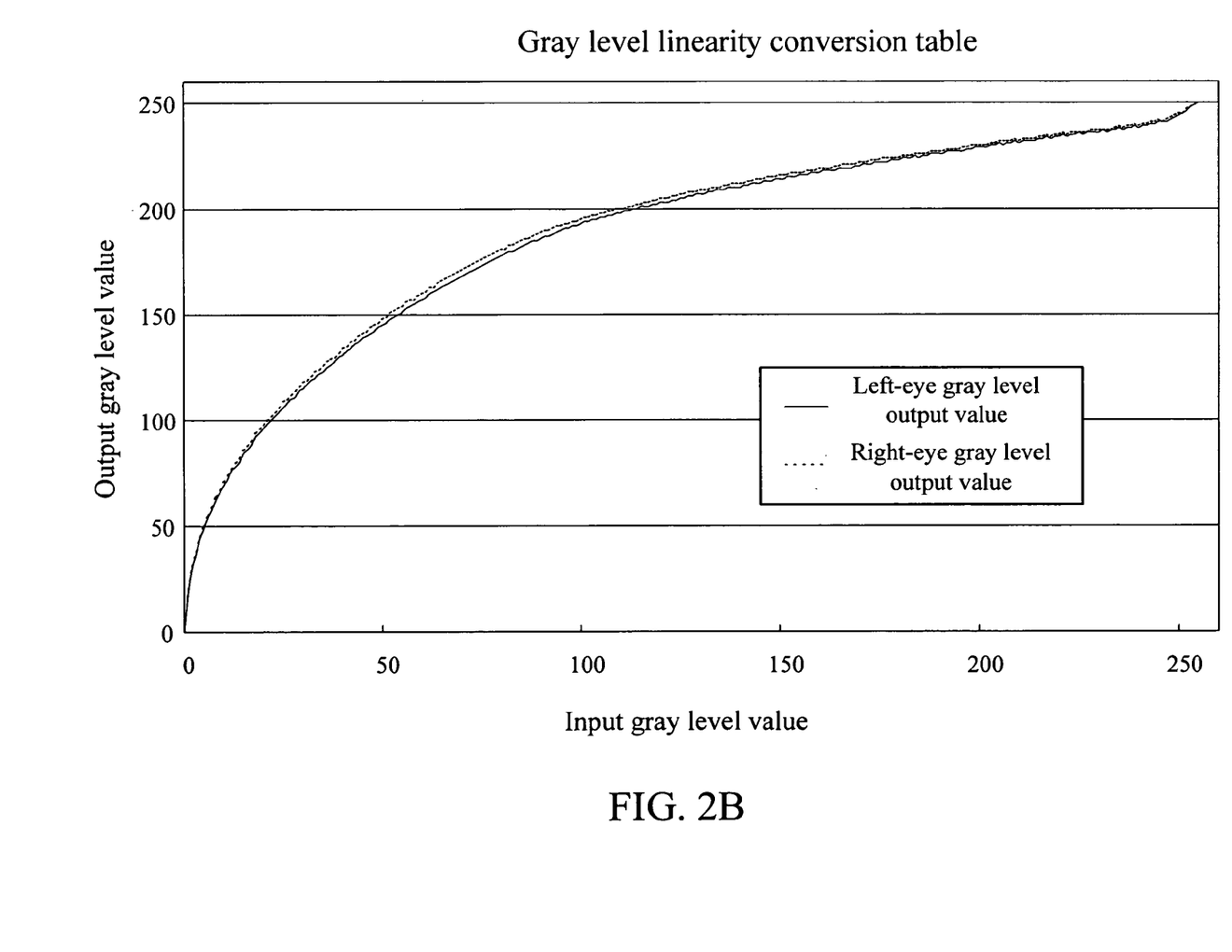
FIG. 2B shows the gray level linearity conversion table of a preferred embodiment based on the invention.

In the embodiment, a gray level lightness conversion curve is established based on the characteristics of the display panel 3, and a gray level linearity conversion table is established based on the gray level lightness conversion curve. Referring to FIG. 2A and FIG. 2B, FIG. 2A shows the gray level lightness conversion curve based on the preferred embodiment. And, FIG. 2B shows the gray level linearity conversion table based on the preferred embodiment.

The gray level lightness conversion curve includes a left-eye gray level lightness conversion curve and a right-eye gray level lightness conversion curve. As shown in FIG. 2A, the left-eye and right-eye gray levels of the display panel 3 are measured by a measuring instrument through a polarization glass and a corresponding polarization panel module. The measuring method is that only left-eye image information is left by shutting the right-eye image information first, and then the corresponding lightness is measured by the left-eye polarization glass to establish the left-eye gray level lightness conversion curve.

Similarly, only right-eye image information is left by shutting the left-eye image information, and then the corresponding lightness is measured by the right-eye polarization glass to establish the right-eye gray level lightness conversion curve. And, as shown in FIG. 2B, the smaller left-eye and right-eye lightness values (gray level is 255) are set as the maximum left-eye and right-eye lightness values based on the gray level lightness conversion curve, and the gray level linearity conversion table is established based on the maximum left-eye and right-eye lightness values. The gray level linearity conversion table includes a left-eye gray level linearity conversion table and a right-eye gray level linearity conversion table.

Figure 2C:
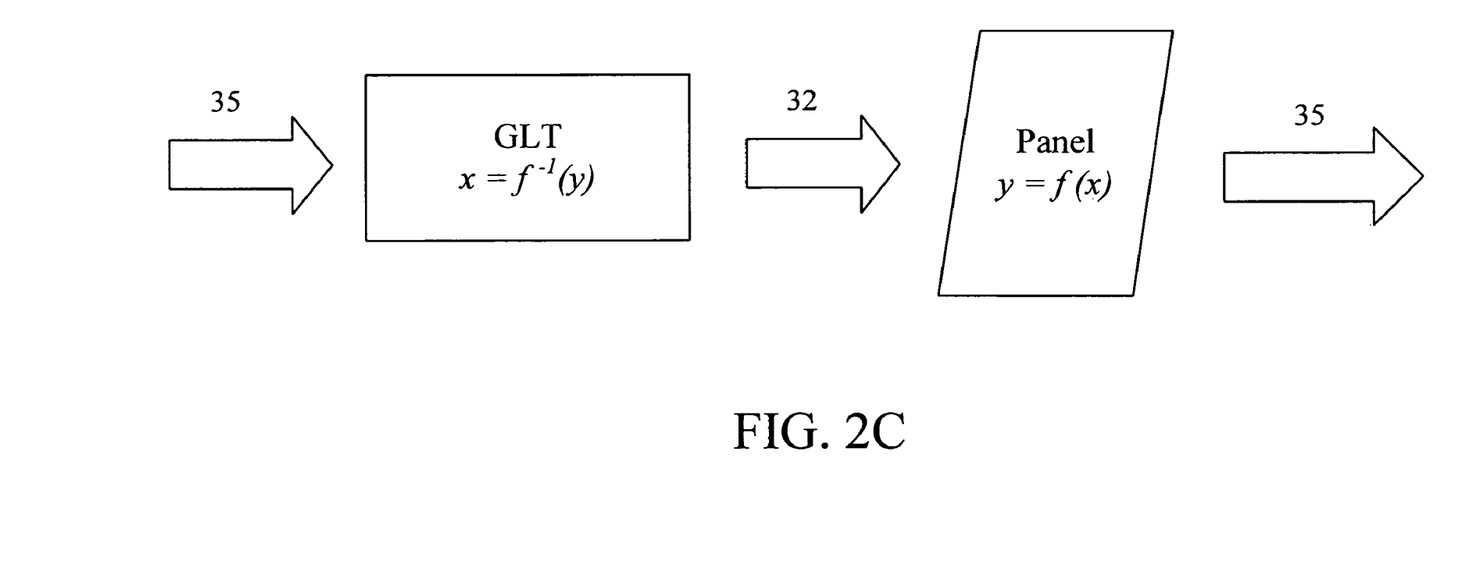
FIG. 2C shows the concept of generating a gray level linearity conversion table.

Besides, referring to FIG. 2C, it shows the concept of generating a gray level linearity conversion table. As shown in FIG. 2C, an output gray level is 35, and a converted output can be found by looking up a gray level linearity conversion table and its gray level 32. The converted output is inputted into the panel and the final output value is 35. Therefore, the original output value is based upon the panel characteristics. That is to say, if the panel characteristics are described by a function, the gray level linearity conversion table will be an inverse function of the function. Thus, the output can be correctly outputted through the gray level linearity conversion. The gray level linearity conversion table of FIG. 2B is established based on this concept.

Thus, the adjusted image line transmitted by the adjusting module 11 is converted into a converted image line by the first converting module 12 based on the right-eye gray level linearity conversion table of FIG. 2B. Similarly, the adjusted image line transmitted by the adjusting module 11 is converted into a converted image line by the second converting module 13 based on the left-eye gray level linearity conversion table of FIG. 2B. Besides, the problem of outputting by the first converting module 12 and the second converting module 13 is mentioned above, so it is not further described herein.

In the embodiment, the first determining module 14 and the second determining module 15 are electrically coupled to the selector 19 and the selector 20 respectively. The first determining module 14 is configured to receive the jth adjusted first-eye-viewed image line. And, the second determining module 15 is configured to receive the (i−1)th adjusted second-eye-viewed image line.

The first determining module 14 is used for determining the jth set of second-eye-viewed leakage values based on the jth adjusted first-eye-viewed image line and a plurality of pre-stored second-eye-viewed leakage values. And, the second determining module 15 is used for determining the ith set of first-eye-viewed leakage values in accordance with the (i−1)th adjusted second-eye-viewed image line and a plurality of pre-stored first-eye-viewed leakage values.

Namely, the first determining module 14 receives a certain row of the converted first-eye-viewed image lines, and then determines the next row of the second-eye-viewed leakage values based on the pre-stored second-eye-viewed leakage values. And the second determining module 15 receives a certain row of the converted second-eye-viewed image lines, and then determines the next row of the first-eye-viewed leakage values based on the pre-stored first-eye-viewed leakage values.

For example, the first determining module 14 receives the seventh row of converted image lines (namely the fourth converted first-eye-viewed image line), and then determines the eighth row of the second-eye-viewed leakage values (namely the third converted second-eye-viewed image line) based on the pre-stored second-eye-viewed leakage values. For example, the second determining module 15 receives the sixth row of converted image lines (namely the third converted second-eye-viewed image line), and then determines the seventh row of the first-eye-viewed leakage values (namely the fourth converted first-eye-viewed image line) based on the pre-stored first-eye-viewed leakage values. Herein the pre-stored leakage values represent the right-eye information received by the left-eye or the left-eye information received by the right-eye; that is to say, the left-eye information is leaked to the right-eye or the right-eye information is leaked to the left-eye. The details of the measurement method are not described herein.

Besides, although the first determining module 14 and the second determining module 15 receive the image signals transmitted by the selector 19 at the same time, determine a set of leakage values respectively, and transmit them to the selector 20 respectively, the selector 20 can still correctly transmit a set of leakage values to the line buffer 16 and store them in the line buffer 16 based on the signal of the left/right eye determinater 22. Similar to the above mentioned selector 19, the selector 20 selectively transmits a set of leakage values to the line buffer 16 and stores them in the line buffer 16 based on the signal of the left/right eye determinater 22, and abandons another set of leakage values. In the embodiment, each of the pre-stored second-eye-viewed leakage values corresponds to one of the plurality of gray levels.

The first determining module 14 judges which of the gray levels match the jth converted pixel of the first-eye-viewed image lines, and then determines a set of pre-stored second-eye-viewed leakage values corresponded to the matched gray levels as the jth second-eye-viewed leakage values. And, each of the pre-stored first-eye-viewed leakage values corresponds to one of the plurality of gray levels. Besides, the second determining module 15 judges which of the gray levels match the (i−1)th converted pixel of the second-eye-viewed image lines, and then determines a set of pre-stored first-eye-viewed leakage values corresponded to the matched gray levels as the ith set of first-eye-viewed leakage values.

Namely, the first determining module 14 finds the gray level of each pixel matched the received certain row of converted first-eye-viewed image lines respectively. Then, the second-eye-viewed leakage values corresponding to the gray levels are determined to form a set of the next row of second-eye-viewed leakage values. Similarly, the second determining module 15 finds the gray level of each pixel matched the received certain row of converted second-eye-viewed image lines respectively. Then, the first-eye-viewed leakage values corresponding to the gray levels are determined to form a set of the next row of first-eye-viewed leakage values.

Figure 3A:
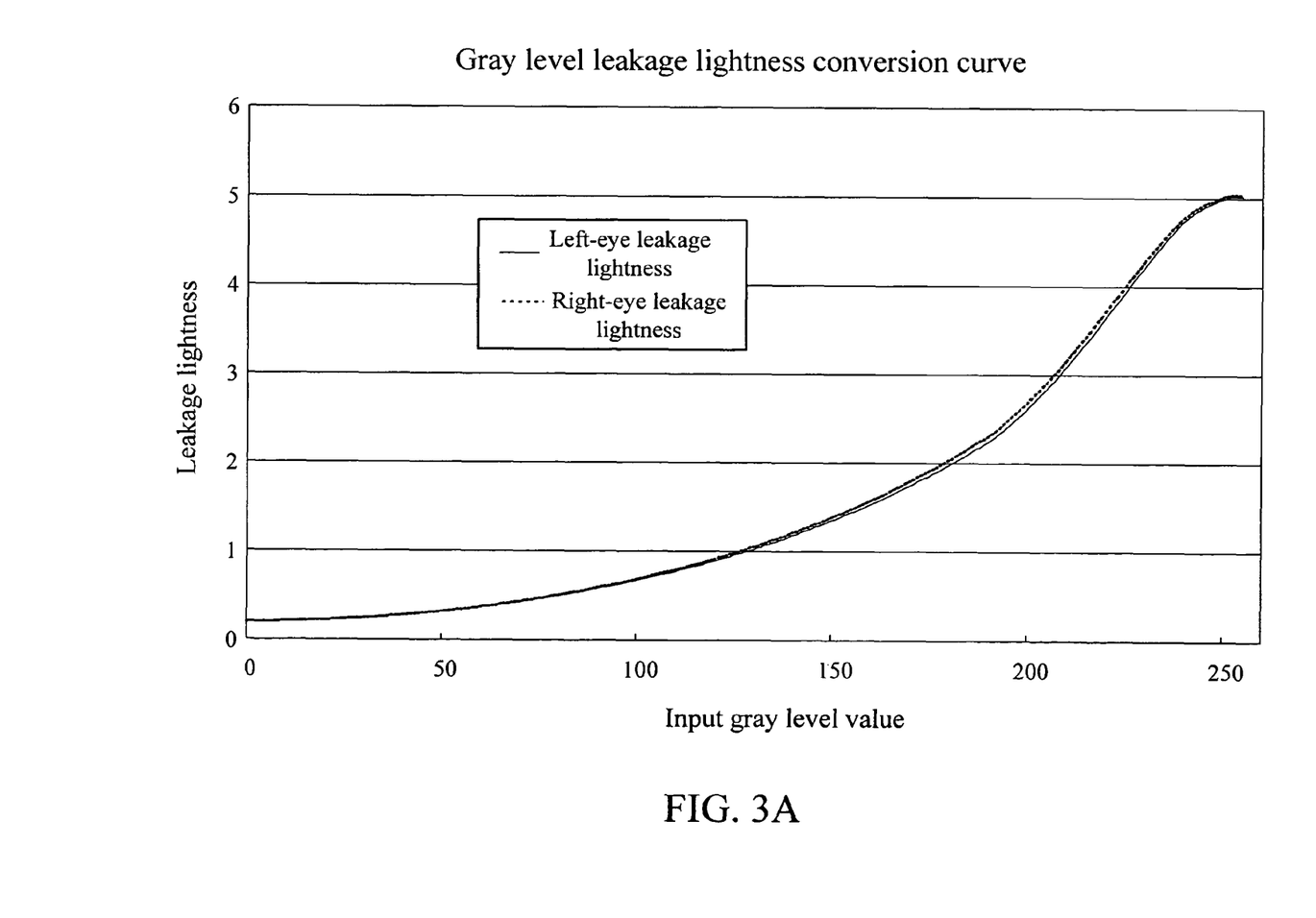
FIG. 3A shows a gray level leakage lightness conversion curve.

In the embodiment, the pre-stored second-eye-viewed leakage values and the pre-stored first-eye-viewed leakage values can be shown by a left-eye gray level leakage lightness conversion curve and a right-eye gray level leakage lightness conversion curve respectively, as shown in FIG. 3A.

Figure 3B:
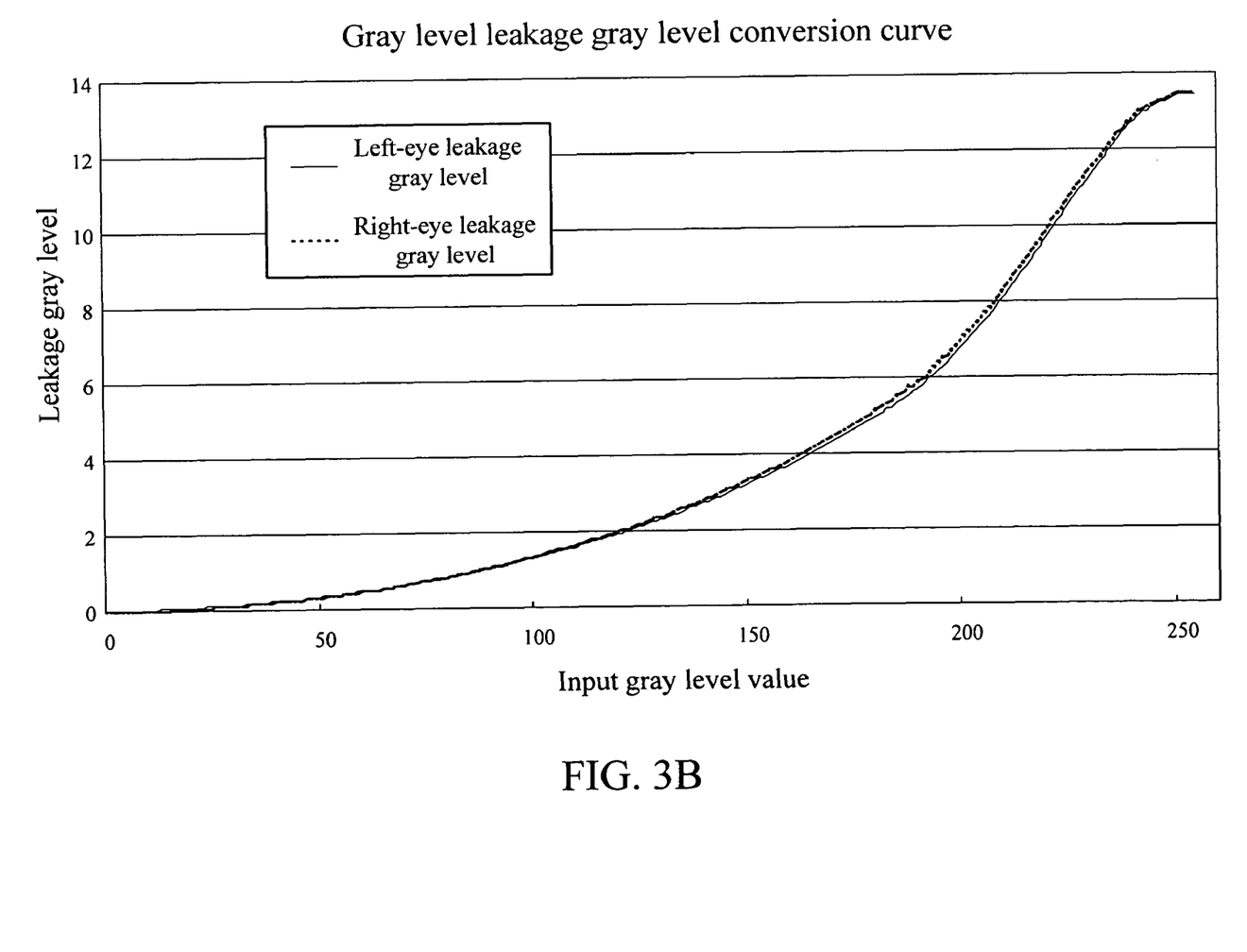
FIG. 3B shows a gray level leakage gray level conversion curve.

Please refer to FIG. 3A and FIG. 3B. FIG. 3A shows a gray level leakage lightness conversion curve and FIG. 3B shows a gray level leakage gray level conversion curve. With a polarized glass and a matched polarized panel module, the left/right eye gray levels leakage lightness conversion curve of the display panel 3 measured by the measurement instrument, as shown in FIG. 3A.

The measuring method is that only left-eye image information is left by shutting the right-eye image information first, and then the corresponding lightness is measured by the right-eye polarization glass to establish the right-eye gray level lightness conversion curve. Similarly, only right-eye image information is left by shutting the left-eye image information, and then the corresponding lightness is measured by the left-eye polarization glass to establish the left-eye gray level lightness conversion curve.

And, as shown in FIG. 2B, the maximum lightness value is divided by 255 as a single gray level lightness value. Then, the left-eye leakage lightness is divided by the single gray level lightness as a left-eye leakage gray level to generate a left-eye gray level leakage gray level conversion curve, as shown in FIG. 3B. Similarly, the right-eye leakage lightness is divided by the single gray level lightness as a right-eye leakage gray level to generate a right-eye gray level leakage gray level conversion curve, as shown in FIG. 3B. Besides, if the panel itself has obvious leakage due to the background lightness, it should be deducted while calculating the single gray level lightness and leakage gray levels.

Thus, the left-eye leakage gray levels and the right-eye leakage gray levels are the pre-stored second-eye-viewed leakage values and the pre-stored first-eye-viewed leakage values respectively. Namely, the first determining module 14 judges which gray levels the pixels of the converted first-eye-viewed image lines (namely right-eye-viewed image lines) match. And, according to the left-eye gray level leakage gray level conversion curve of FIG. 3B, a set of left-eye leakage gray levels corresponding to the matched gray levels are determined as the second-eye-viewed leakage values.

Similarly, the second determining module 15 judges the gray levels with which the pixels of the converted second-eye-viewed image lines (namely left-eye-viewed image lines) match. And, according to the right-eye gray level leakage gray level conversion curve of FIG. 3B, a set of right-eye leakage gray levels corresponding to the matched gray levels are determined as the first-eye-viewed leakage values.

In the embodiment, the line buffer 16 is electrically coupled to the selector 20. The line buffer 16 is configured to alternately receive and buffer the jth set of second-eye-viewed leakage values and the ith set of first-eye-viewed leakage values. And, the distributing module 17 is configured to receive the jth set of second-eye-viewed leakage values, buffered in the line buffer 16, to generate the jth set of distributed second-eye-viewed leakage values relative to the jth second-eye-viewed image line, or receive the ith set of first-eye-viewed leakage values, buffered in the line buffer 16, to generate the ith set of distributed first-eye-viewed leakage values relative to the ith first-eye-viewed image line.

Namely, a set of leakage values stored in the line buffer 16 are weightedly distributed to be a set of distributed leakage values by the distributing module 17. Whether the first-eye-viewed leakage values or the second-eye-viewed leakage values are stored in the line buffer 16 is determined by the selector 20, as described above.

Each second-eye-viewed leakage value of the jth set points at one of pixels of the jth second-eye-viewed image line and is weightedly distributed to the pixel which should be pointed at and its neighboring pixel of the jth second-eye-viewed image line to generate the jth set of distributed second-eye-viewed leakage values. Similarly, each first-eye-viewed leakage value of the ith set points at one of pixels of the ith first-eye-viewed image line and is weightedly distributed to the pointed pixel and its neighboring pixel of the ith first-eye-viewed image line to generate the ith set of distributed first-eye-viewed leakage values.

The distributed first-eye-viewed leakage values and the distributed second-eye-viewed leakage values are inputted to the adjusting module 11. For example, if the line buffer 16 stores a set of first-eye-viewed leakage values, each of the leakage values is corresponding to a pixel. The method of weighting distribution is that each of the leakage values is weightedly distributed to the corresponding pixel and its neighboring pixel. And, a set of distributed leakage values is formed by adding all distributed leakage values of the pixels; namely, it is a set of distributed first-eye-viewed leakage values.

For example, if the 38th leakage value is corresponding to the 38th pixel, the leakage value is weightedly distributed to the 38th pixel, the neighboring 37th pixel, and the 39th pixel. The weighting can be set additionally. As shown in the above example, the 38th pixel gets the distribution of ½ leakage value, and the 37th pixel and the 39th pixel get the distribution of ¼ leakage value respectively. Thus, the 37th pixel will have the leakage values distributed by the 36th, 37th, and 38th leakage values respectively. The 37th leakage value of the set of distributed leakage values will be obtained by adding them up.

A set of leakage values obtained by the distributing module 17 will be transmitted to the adjusting module 11 for adjusting the next row of image lines. This procedure will be repeated until the 3D image will be totally adjusted.

Figure 4A:
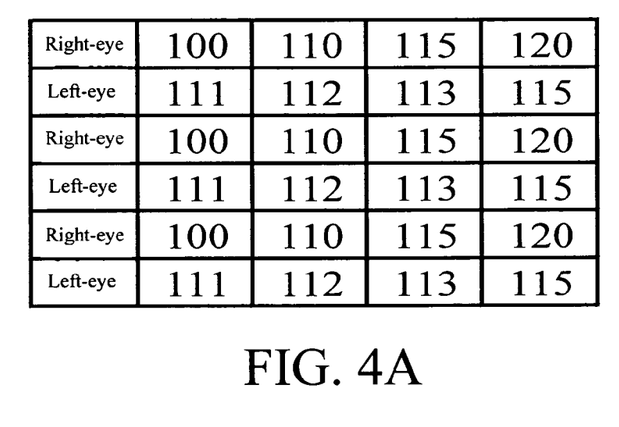
FIG. 4A~FIG. 4H show the schematic diagrams of an application example of the preferred embodiment based on the invention.
Figure 4B:
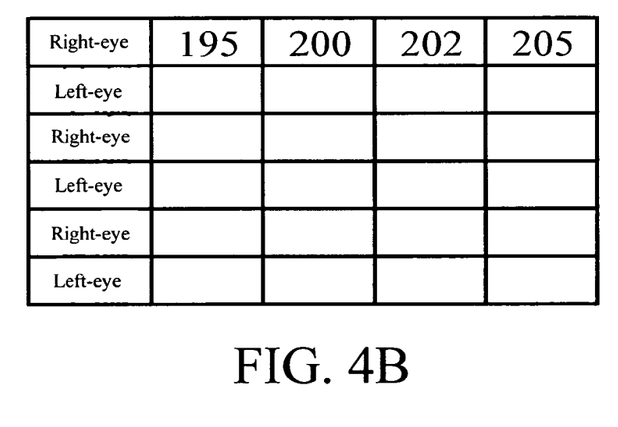

The following is an application example which explains the operation of the adjusting apparatus 1. Please refer to FIG. 1 and FIG. 4A. FIG. 4A shows the schematic diagram of an application example in the preferred embodiment. In FIG. 4A, the gray levels of the 3D image S corresponding to the pixels of image lines after gamma 2.2 conversion is presented. The schematic diagram only includes 6*(4 gray levels so as to express the application example simply and clearly. And, the 6*(4 gray levels are interlacedly formed by the right-eye information and left-eye information. Because the first row of input gray levels has no former row of input (i. e. no distributed leakage values), the input gray levels will be directly transmitted to the first converting module 12 through the adjusting module 11. According to the right-eye gray level linearity conversion table shown in FIG. 2B, the first converting module 12 judges the converted gray levels, as shown in FIG. 4B.

Figure 4C:
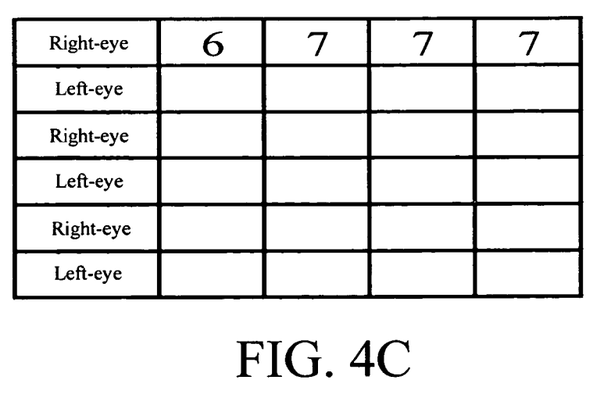
Figure 4D:
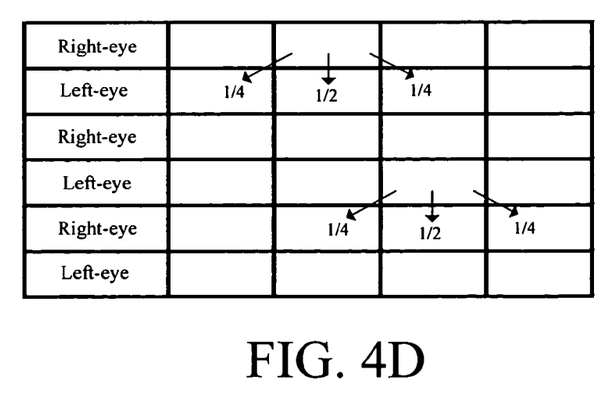
Figure 4E:
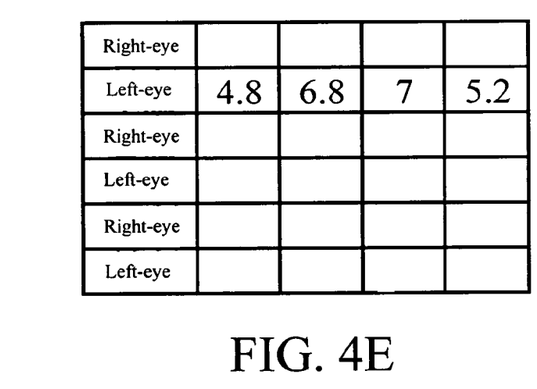

Afterward, the converted gray levels are outputted to the display panel 3 and the first determining module 14. According to the gray level leakage conversion curve of left-eye shown in FIG. 3B, the first determining module 14 judges the left-eye leakage values respectively, as shown in FIG. 4C. And, the determined leakage gray levels are transmitted to the line buffer 16 and stored therein. In order to give a simple explanation, the numbers shown in FIG. 4C have been rounded off. When the distributed left-eye leakage values are required, the distributing module 17 will receive the leakage gray levels stored in the line buffer 16, and the leakage gray levels are calculated in a weighting distribution way to generate the distributed left-eye leakage values. Then, the weighting distribution is used to add up the leakage gray levels of the corresponding position and neighboring positions by ½ and ¼ weighting values respectively, as shown in FIG. 4D. As shown in FIG. 4E, the distributed left-eye leakage values are:

$$[0*(1/4)+6*(1/2)+7*(1/4)]=4.75,$$

$$[6*(1/4)+7*(1/2)+7*(1/4)]=6.75,$$

$$[7*(1/4)+7*(1/2)+7*(1/4)]=7, \text{ and}$$

$$[7*(1/4)+7*(1/2)+0*(1/4)]=5.2.$$

Because the first position has only one neighboring position, only one side of the first position is weighted. Similarly, only one side of the fourth position is weighted. However, in practical applications, the weighting of the special positions can be determined in other ways and not limited to this case.

Then, the second row of left-eye input gray levels in FIG. 4A is outputted to the adjusting module 11, and the distributed left-eye leakage values are subtracted from the inputted gray levels by the adjusting module 11. Next, the calculated results are transmitted to the second converting module 13. Thus, the calculated results are presented as follows:

111−4.75=106,

112−6.75=105,

113−7=106, and

115−5.2=110.

The calculated results of the above mentioned equations have been rounded off. And, the decimal part of the original calculated results can be outputted by further adding up to be an integer in a diffusion way. However, this kind of calculation is not processed in this case.

Figure 4F:
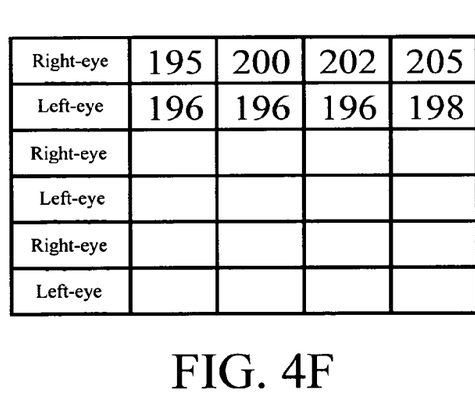
Figure 4G:
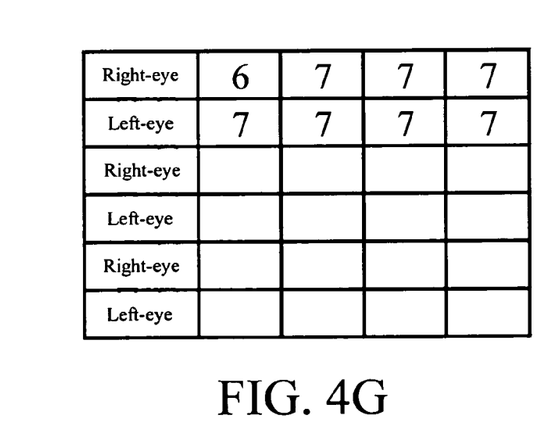
Figure 4H:
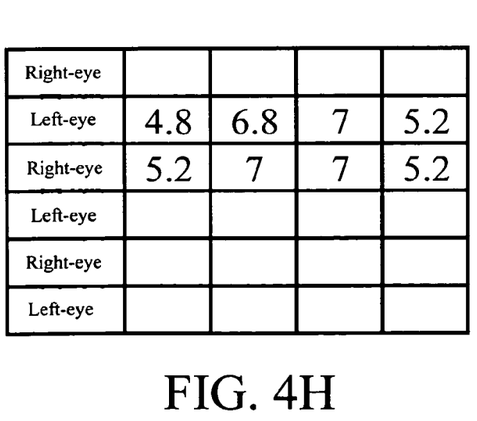

According to the gray level linearity conversion curve of left-eye shown in FIG. 2B, the second determining module 13 judges the converted gray levels respectively, as shown in FIG. 4F. FIG. 4F is a renewed form of FIG. 4B. Afterward, the converted gray levels are outputted to the display panel 3 and the second determining module 15. According to the gray level leakage conversion curve of right-eye, the second determining module 15 judges the right-eye leakage gray levels respectively, as shown in FIG. 4G. And, the determined leakage gray levels are transmitted to the line buffer 16 and stored therein. FIG. 4G is a renewed form of FIG. 4C. Similarly, the numbers shown in FIG. 4G have been rounded off. When the distributed right-eye leakage values are needed, the distributing module 17 will receive the leakage gray levels stored in the line buffer 16, and the leakage gray levels are calculated in a weighting distribution way to be the distributed right-eye leakage values. As shown in FIG. 4H, the distributed right-eye leakage values are presented as follows:

[0*(1/4)+7*(1/2)+7*(1/4)]=5.2,

[7*(1/4)+7*(1/2)+7*(1/4)]=7,

[7*(1/4)+7*(1/2)+7*(1/4)]=7, and

[7*(1/4)+7*(1/2)+0*(1/4)]=5.2.

FIG. 4H is a renewed form of FIG. 4E. Afterward, the third row of right-eye input gray levels in FIG. 4A are inputted to the adjusting module 11. The distributed right-eye leakage values are subtracted from the inputted gray levels by the adjusting module 11. According to the right-eye gray level linearity conversion table shown in FIG. 2B, the converted gray levels are judged by the first converting module 12. Then, the converted gray levels are outputted to the display panel 3 and the first determining module 14.

According to the gray level leakage conversion curve of left-eye shown in FIG. 3B, the first determining module 14 will judge the left-eye leakage gray level. And, the determined leakage gray levels are transmitted to the line buffer 16 and stored therein. Finally, the distributing module 17 receives the leakage gray levels stored in the line buffer 16, and the leakage gray levels are calculated in a weighting distribution way to generate the distributed left-eye leakage values.

After repeatedly adjusting, converting, determining, and distributing, each row of information of the 3D image S will be processed and outputted to the display panel 3. It should be noted that the last row of the information of the 3D image S has no leakage of the next row of information to be distributed, so its leakage value does not need to be determined. Anyhow, after the 3D image S is processed, the next 3D image can be processed as well as the former examples.

Figure 5:
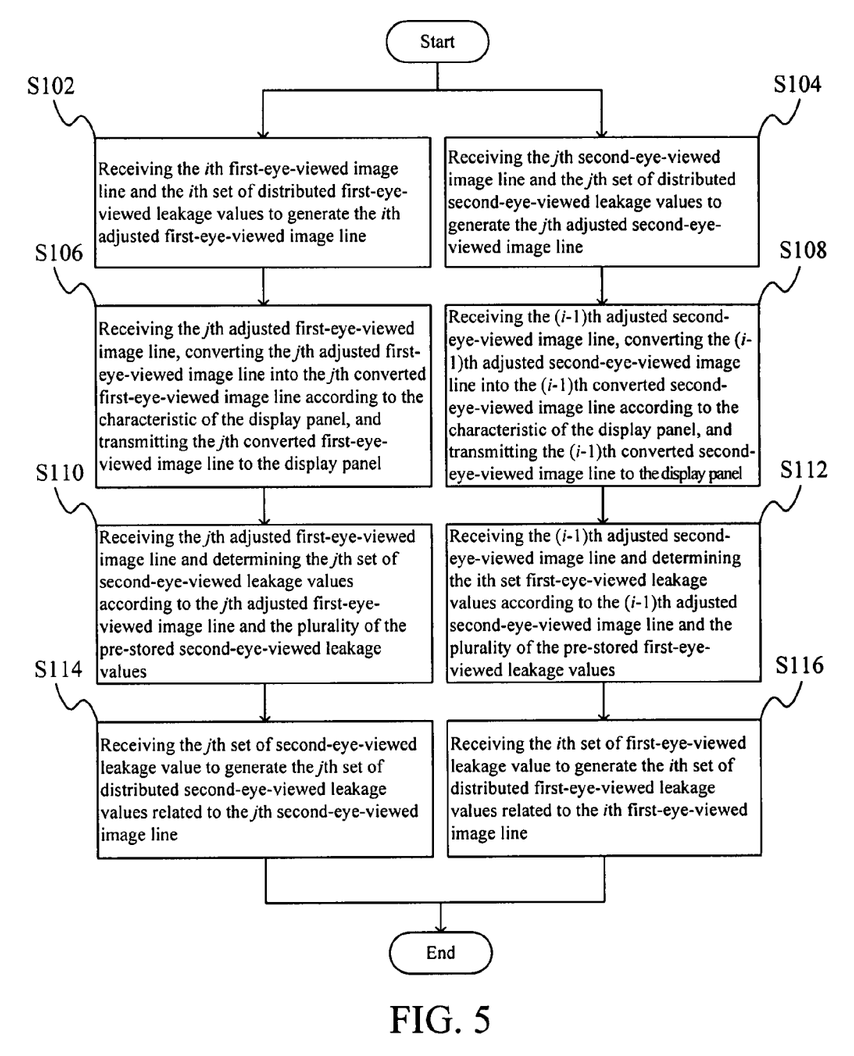
FIG. 5 is a flow diagram of the adjusting method based on the invention.

Please refer to FIG. 5. FIG. 5 is a flow diagram of the adjusting method based on the invention. The method is used for adjusting a 3D image and outputting it to a display panel. The 3D image is constituted by interlaced N first-eye-viewed image lines and N second-eye-viewed image lines. N is an integer larger than 1. The method includes the following steps. First, the ith first-eye-viewed image line and an ith set of distributed first-eye-viewed leakage values are received to generate an ith adjusted first-eye-viewed image line, as shown in step S102. The ith set of distributed first-eye-viewed leakage values is generated according to the (i−1)th second-eye-viewed image line. Or, the jth second-eye-viewed image line and a jth set of distributed second-eye-viewed leakage values are received to generate a jth adjusted second-eye-viewed image line to the display panel, as shown in step S104. The jth set of distributed second-eye-viewed leakage values is generated according to the jth first-eye-viewed image line. Herein i is an integer index ranging from 2 to N, and j is an integer index ranging from 1 to N.

After step S102, the jth adjusted first-eye-viewed image line is received and converted into the jth converted first-eye-viewed image line based on the characteristic of the display panel and transmitted to the display panel, as shown in step S106. Or, after step S104, the (i−1)th adjusted second-eye-viewed image line is received and converted into the (i−1)th converted second-eye-viewed image line based on the characteristic of the display panel, and transmitted to the display panel, as shown in step S108.

After step S106, the jth adjusted first-eye-viewed image line is received to determine the jth set of second-eye-viewed leakage values based on the jth adjusted first-eye-viewed image line and a plurality of pre-stored second-eye-viewed leakage values, as shown in step S110. Each of the pre-stored second-eye-viewed leakage values corresponds one of the plurality of gray levels; the pixel of the jth adjusted first-eye-viewed image line is judged which gray levels are matched with it, and then a set of pre-stored second-eye-viewed leakage values corresponding to the matched gray levels is determined as the jth set of second-eye-viewed leakage values.

Afterward, the jth set of second-eye-viewed leakage values is received to generate the jth set of distributed second-eye-viewed leakage values relative to the jth second-eye-viewed image line, as shown in step S114, wherein each of the jth set second-eye-viewed leakage values is corresponding to one of the pixels of the jth second-eye-viewed image line, and is assigned to the corresponding pixel of the jth second-eye image line and the neighboring pixel of the directed pixel to generate the jth set of distributed second-eye-viewed leakage values in the weighting distribution way.

After step S108, the (i−1)th adjusted second-eye-viewed image line is received to determine the ith set of first-eye-viewed leakage values based on the (i−1)th adjusted second-eye-viewed image line and a plurality of pre-stored first-eye-viewed leakage values, as shown in step S112, wherein each of the pre-stored first-eye-viewed leakage values corresponds one of the plurality of gray levels; the pixel of the (i−1)th adjusted second-eye-viewed image line is judged which gray levels are matched with it. A set of the pre-stored first-eye-viewed leakage values corresponding to the matched gray levels is determined as the ith set of first-eye-viewed leakage values.

Afterward, the ith set of first-eye-viewed leakage values is received to generate the ith distributed first-eye-viewed leakage value relative to the ith first-eye-viewed image line, as shown in step S116, wherein each of the ith set of the first-eye-viewed leakage values is corresponding to one of the pixels of the ith first-eye-viewed image line and is weighting distributed to the corresponding pixel of the ith first-eye-viewed image line and the neighboring pixel of the corresponding pixel to generate the ith set of distributed first-eye-viewed leakage values.

It deserves to be mentioned that because the 3D image is formed of N first-eye-viewed image lines and N second-eye-viewed image lines, it is processed in an interlaced way in the former flow diagram. That is to say, certain image line is processed first, and then the next image line is processed. The process of the 3D image is finished after the processes of all image lines are finished. Because the first first-eye-viewed image line has no distributed leakage values generated by former image line, the first first-eye-viewed image line is directly performed with step S 106. And, because the last second-eye-viewed image line has no next image line to distribute its leakage value, the following steps S112 and S116 do not need to be performed.

Compared to the prior art, the adjusting apparatus and method based on the invention solve the leakage problem via the leakage distribution renew calculation, and the adjusted image input are converted based on the characteristic of the display panel; thus, the image can be correctly displayed on the display panel. If the gamma characteristic of the panel is 1 or the deviation generated by the panel is small enough to be neglected, the above mentioned converting module and converting step will be neglected and still have the effect of improving image display.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjusting apparatus for adjusting a 3D image to be outputted to a display panel, the 3D image being constituted by interlaced N first-eye-viewed image lines and N second-eye-viewed image lines, N being an integer larger than 1, the adjusting apparatus comprising:
    an adjusting module configured to receive the ith first-eye-viewed image line and an ith set of distributed first-eye-viewed leakage values, generated according to the (i−1)th second-eye-viewed image line, to generate an ith adjusted first-eye-viewed image line for the display panel, or receive the jth second-eye-viewed image line and a jth set of distributed second-eye-viewed leakage values, generated according to the jth first-eye-viewed image line, to generate a jth adjusted second-eye-viewed image line for the display panel, i being an integer index ranging from 2 to N, and j being an integer index ranging from 1 to N;
    a first determining module, configured to receive the jth adjusted first-eye-viewed image line, for determining the jth set of second-eye-viewed leakage values based on the jth adjusted first-eye-viewed image line and a plurality of pre-stored second-eye-viewed leakage values;
    a second determining module, configured to receive the (i−1)th adjusted second-eye-viewed image line, for determining the ith set of first-eye-viewed leakage values based on the (i−1)th adjusted second-eye-viewed image line and a plurality of pre-stored first-eye-viewed leakage values;
    a line buffer configured to alternately receive and buffer the jth set of second-eye-viewed leakage values and the ith set of first-eye-viewed leakage values; and
    a distributing module configured to receive the jth set of second-eye-viewed leakage values, buffered in the line buffer, to generate the jth set of distributed second-eye-viewed leakage values relative to the jth second-eye-viewed image line, or receive the ith set of first-eye-viewed leakage values, buffered in the line buffer, to generate the ith set of distributed first-eye-viewed leakage values relative to the ith first-eye-viewed image line.

2. The adjusting apparatus of claim 1, further comprising:
    a first converting module, electrically coupled between the adjusting module and the first determining module and electrically coupled to the display panel, for receiving the jth adjusted first-eye-viewed image line outputted by the adjusting module, and converting the jth adjusted first-eye-viewed image line into a jth converted first-eye-viewed image line based on the characteristic of the display panel, wherein the jth converted first-eye-viewed image line replaces the jth adjusted first-eye-viewed image line and is outputted to the display panel and the first determining module; and
    a second converting module, electrically coupled between the adjusting module and the second determining module and electrically coupled to the display panel, for receiving the (i−1)th adjusted second-eye-viewed image line outputted by the adjusting module, and converting the (i−1)th adjusted second-eye-viewed image line into an (i−1)th converted second-eye-viewed image line based on the characteristic of the display panel, wherein the (i−1)th converted second-eye-viewed image line replaces the (i−1)th adjusted second-eye-viewed image line and is outputted to the display panel and the second determining module.

3. The adjusting apparatus of claim 1, wherein each of the pre-stored second-eye-viewed leakage values corresponds to one of a plurality of gray levels, the first determining module judges which of the gray levels match the pixels of the jth adjusted first-eye-viewed image line, and then determines a set of the pre-stored second-eye-viewed leakage values, corresponding to the matched gray levels, as the jth set of second-eye-viewed leakage values.

4. The adjusting apparatus of claim 3, wherein each of the jth set of second-eye-viewed leakage values is directed to one of the pixels of the jth second-eye-viewed image line, and is weightedly distributed to the directed pixel and the pixels adjacent to the directed pixel of the jth second-eye-viewed image line to generate the jth set of distributed second-eye-viewed leakage values.

5. The adjusting apparatus of claim 1, wherein each of the pre-stored first-eye-viewed leakage values corresponds to one of a plurality of gray levels, the second determining module judges which of the gray levels match the pixels of the (i−1)th adjusted second-eye-viewed image line, and then determines a set of the pre-stored first-eye-viewed leakage values, corresponding to said matched gray levels, as the ith set of first-eye-viewed leakage values.

6. The adjusting apparatus of claim 5, wherein each of the ith set of first-eye-viewed leakage values is directed to one of the pixels of the ith first-eye-viewed image line, and is weightedly distributed to the directed pixel and the pixels adjacent to the directed pixel of the ith first-eye-viewed image line to generate the ith set of distributed first-eye-viewed leakage values.

7. A method for adjusting a 3D image to be outputted to a display panel, the 3D image being constituted by interlaced N first-eye-viewed image lines and N second-eye-viewed image lines, N being an integer larger than 1, the method comprising the steps of:
    receiving the ith first-eye-viewed image line and an ith set of distributed first-eye-viewed leakage values, generated according to the (i−1)th second-eye-viewed image line, to generate an ith adjusted first-eye-viewed image line for the display panel, or receiving the jth secondeye-viewed image line and a jth set of distributed second-eye-viewed leakage values, generated according to the jth first-eye-viewed image line, to generate a jth adjusted second-eye-viewed image line for the display panel, i being an integer index ranging from 2 to N, and j being an integer index ranging 1 to N;

receiving the jth adjusted first-eye-viewed image line to determine the jth set of second-eye-viewed leakage values based on the jth adjusted first-eye-viewed image line and a plurality of pre-stored second-eye-viewed leakage values;

receiving the jth set of second-eye-viewed leakage values to generate the jth set of distributed second-eye-viewed leakage values relative to the jth second-eye-viewed image line;

receiving the (i−1)th adjusted second-eye-viewed image line to determine the ith set of first-eye-viewed leakage values based on the (i−1)th adjusted second-eye-viewed image line and a plurality of pre-stored first-eye-viewed leakage values; and receiving the ith set of first-eye-viewed leakage values to generate the ith distributed first-eye-viewed leakage value relative to the ith first-eye-viewed image line and is outputted to the display panel.

8. The method of claim 7, further comprising the steps of:

receiving the jth adjusted first-eye-viewed image line, and converting the jth adjusted first-eye-viewed image line into a jth converted first-eye-viewed image line based on the characteristic of the display panel, wherein the jth converted first-eye-viewed image line replaces the jth adjusted first-eye-viewed image line and is outputted to the display panel; and receiving the (i−1)th adjusted second-eye-viewed image line, and converting the (i−1)th adjusted second-eye-viewed image line into an (i−1)th converted second-eye-viewed image line based on the characteristic of the display panel, wherein the (i−1)th converted second-eye-viewed image line replaces the (i−1)th adjusted second-eye-viewed image line and is outputted to the display panel.

9. The method of claim 7, wherein each of the pre-stored second-eye-viewed leakage values corresponds to one of a plurality of gray levels, the pixels of the jth adjusted first-eye-viewed image line are judged to match which of the gray levels, and a set of the pre-stored second-eye-viewed leakage values, corresponding to said matched gray levels, are determined to be as the jth set of second-eye-viewed leakage values.

10. The method of claim 9, wherein each of the jth set of second-eye-viewed leakage values is directed to one of the pixels of the jth second-eye-viewed image line and is weightedly distributed to the directed pixel and the pixels adjacent to the directed pixel of the jth second-eye-viewed image line to generate the jth set of distributed second-eye-viewed leakage values.

11. The method of claim 7, wherein each of the pre-stored first-eye-viewed leakage values corresponds to one of a plurality of gray levels, the pixels of the (i−1)th adjusted second-eye-viewed image line are judged to match which of the gray levels, and a set of the pre-stored first-eye-viewed leakage values, corresponding to said matched gray levels, are determined to be as the ith first-eye-viewed leakage value.

12. The method of claim 11, wherein each of the ith set of first-eye-viewed leakage values is directed to one of the pixels of the ith first-eye-viewed image line and is weightedly distributed to the directed pixel and the pixels adjacent to the directed pixel of the ith first-eye-viewed image line to generate the ith set of distributed first-eye-viewed leakage values.

* * * * *